United States Patent
Malloy et al.

(10) Patent No.: US 8,577,956 B2
(45) Date of Patent: Nov. 5, 2013

(54) USER-CONFIGURABLE NETWORK PERFORMANCE MONITORS

(75) Inventors: Patrick J. Malloy, Washington, DC (US); Antoine Dunn, Kensington, MD (US); John Wilson Strohm, Rockville, MD (US); Steven Niemczyk, Bethesda, MD (US)

(73) Assignee: Riverbed Technology, San Francisco, CA (US)

( * ) Notice: Subject to any disclaimer, the term of this patent is extended or adjusted under 35 U.S.C. 154(b) by 1759 days.

(21) Appl. No.: 11/678,595

(22) Filed: Feb. 24, 2007

(65) Prior Publication Data

US 2007/0214206 A1 Sep. 13, 2007

Related U.S. Application Data

(60) Provisional application No. 60/778,140, filed on Mar. 1, 2006.

(51) Int. Cl.
*G06F 15/16* (2006.01)
(52) U.S. Cl.
USPC .......................... 709/203; 709/217; 709/223
(58) Field of Classification Search
USPC .......................................... 709/206, 217, 223
See application file for complete search history.

(56) References Cited

U.S. PATENT DOCUMENTS

| | | | | |
|---|---|---|---|---|
| 7,292,531 B1* | 11/2007 | Hill | | 370/230.1 |
| 7,607,093 B2* | 10/2009 | Blomquist | | 715/736 |
| 7,617,314 B1* | 11/2009 | Bansod et al. | | 709/224 |
| 7,830,812 B2* | 11/2010 | Atkins et al. | | 370/252 |
| 8,195,443 B2* | 6/2012 | Malloy et al. | | 703/17 |
| 2006/0129670 A1* | 6/2006 | Mayer | | 709/223 |
| 2006/0168207 A1* | 7/2006 | Choong et al. | | 709/224 |

OTHER PUBLICATIONS

U.S. Appl. No. 11/180,879, filed Jul. 3, 2005, Malloy et al.
U.S. Appl. No. 11/358,538, filed Feb. 21, 2006, Malloy et al.

* cited by examiner

*Primary Examiner* — Phuoc Nguyen
(74) *Attorney, Agent, or Firm* — Robert M. McDermott

(57) ABSTRACT

A network analysis system provides for a user-definable display of information related to messages communicated on the network. The network analysis system includes one or more display formats that provide a display of message exchanges between nodes of a network, and a display augmenter that provides additional information on the display based on a user-defined visualization. The user defined visualization includes augmenting the display based on user-defined coloring characteristics and/or augmenting the display with user-defined labels. To further facilitate user control of the augmentation of the display, the system accepts user-defined programs for discriminating among messages, for controlling the labeling of messages, and for controlling the coloring of messages and labels. Commonly used user-defined characteristics and labels are stored in a library, for use via a selection from among the library entries.

52 Claims, 4 Drawing Sheets

```
start_visualization                    /601
    title:          Packet Count      /602
    coloring:       Packet Count Color
end_visualization
                                                        /610
start_coloring                         /611
    title:           Packet Count Color /612
    library:         count              /613
    init_function:   count_color_init   /614
    appl_msg_function: count_message_color /615
    netpk_function:  count_packet_color
end_coloring
```

FIG. 6A

```
# The coloring scheme initialization function
# defines two equal-sized lists that specify the colors
# and their corresponding legend entries.
                                    /613'
def count_color_init (colors, names):            /651
    colors[:] = ["#ff0000", "#ffff00", "#00ff00", "#0000ff"]  /652
    names[:] = ["1 Packet", "2 Packets", "3 Packets", "4+ Packets"]
                                    /615'
def count_packet_color (npk):
    # A network packet always has just one packet,
    # so always return the 0th index into the list of colors.
    return 0  \661
                          /614'
def count_message_color (msg):              /671
    count = msg.get_num_network_packets ()
    return min(count-1, 3) \672
```

FIG. 6B

USER-CONFIGURABLE NETWORK PERFORMANCE MONITORS

This application claims the benefit of U.S. Provisional Patent Application 60/778,140, filed 1 Mar. 2006.

BACKGROUND AND SUMMARY OF THE INVENTION

This invention relates to the field of network analysis, and in particular to user-configurable visualizations for network application performance tools.

More and more applications are designed to be "network-enabled", and the demands for efficient network performance continue to escalate. With increased reliance upon network communications, the demands for network analysis tools also continue to escalate.

To remain competitive, providers of network analysis tools strive to achieve market distinction. Such market distinction is generally achieved by providing inherent analysis capabilities that other providers do not provide, or by providing a user interface that is preferable to the intended user. Significant market research is devoted to identifying the intended users of a tool and the expectations of these users.

Conventionally, the developers of a network analysis tool attempt to anticipate the needs or desires of a majority of their users and to provide one or more display formats that are determined to satisfy these needs and desires. Generally, at least two formats are provided: a graphic display that illustrates the flow of traffic between nodes as a function of time, and a tabular display. The tabular display is generally configured to include each identified characteristic of the message, whereas the graphic display is configured to illustrate only a few characteristics.

In the realm of network analysis tools, such as a tool that displays the transfer of packets among network nodes, a common graphic display format is a Data Exchange Chart, which uses a horizontal time-line to represent each node, and lines or arrows between the node time lines to represent each packet. The placement of the arrow indicates the time of transmission, the time of reception, and the direction of flow, and a feature of the arrow, such as its thickness or color, is used to represent the packet size. Each of these graphically illustrated message characteristics (source node, destination node, transmission time, reception time, message size) is selected as being the characteristics of interest to most of the potential customers/users of the network analysis tool.

As the use of network analysis tools increases, the diversity of the users of the tools increases, and it becomes increasingly difficult to anticipate their needs or desires for the tools. Even when the needs and desires are defined, the cost of developing or modifying a tool to satisfy many diverse requirements increases exponentially. These development costs are particularly sensitive to tasks related to the "look and feel" of a tool, as user preferences are highly subjective, yet often determinative with regard to whether a user chooses to purchase the tool.

When a new class of users and/or potential customers is identified, a significant amount of market research is generally performed to identify the needs and desires of the new users. If a different graphic output is required to provide a display that illustrates the particular characteristics of interest for this group, the development of the new output format generally consumes substantial development time. In like manner, if a particular 'favored' customer expresses a desire for a customized graphic output that illustrates different and/or additional characteristics, relative to the default output format(s), a substantial amount of development time may be consumed developing such a customized format.

It would be advantageous to reduce development costs by allowing users to customize the display of a network analysis tool. It would also be advantageous to allow a user to define criteria for distinguishing among messages and displaying the distinguished messages. It would also be advantageous to allow a user to augment a network analysis tool with user-definable programs to distinguish among messages. It would also be advantageous to label distinguished messages, and to allow a user to control the labeling.

These advantages, and others, can be realized by a network analysis system that provides for a user-definable display of information related to messages communicated on the network. The network analysis system includes one or more display formats that provide a display of message exchanges between nodes of a network, and a display augmenter that provides additional information on the display based on a user-defined visualization. The user defined visualization includes augmenting the display based on user-defined message characteristics and/or augmenting the display with user-defined labels and/or user-configured labelings. To further facilitate user control of the augmentation of the display, the system accepts user-defined programs for discriminating among messages, for controlling the labeling of messages, and for controlling the coloring of messages and labels. Commonly used user-defined characteristics and labels are stored in a library, for use via a selection from among the library entries.

BRIEF DESCRIPTION OF THE DRAWINGS

The invention is explained in further detail, and by way of example, with reference to the accompanying drawings wherein:

FIGS. 6A and 6B illustrate example user programs for defining a visualization for augmenting a display of a network analysis system in accordance with this invention.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For example, the invention is presented in the context of packets of data being transmitted between nodes, although one of ordinary skill in the art will recognize that the concepts of this invention are not limited to packet-based networks. For purposes of simplicity and clarity, detailed descriptions of well-known devices, circuits, and methods are omitted so as not to obscure the description of the present invention with unnecessary detail.

In the context of this disclosure, the term "message" is generally used to indicate communication between nodes, as well as select information associated with these communications. For example, a display of a message may comprise a display of a representation of the communication between a source and destination node, such as a vector between symbols that represent nodes, the source, destination, and other information items generally being extracted from a record of these communications. As is typical in a network analysis system, the records of communications between nodes are provided from a network monitor, such as a "sniffer", that monitors traffic at nodes or on links of a network. Such monitors generally create a copy of the header of each monitored message, optionally with the first n-bytes of the message content, where n is user definable. Filters are commonly available to facilitate the recording of only select classes or types of communications, so that only messages of potential interest are recorded.

Figure 1:
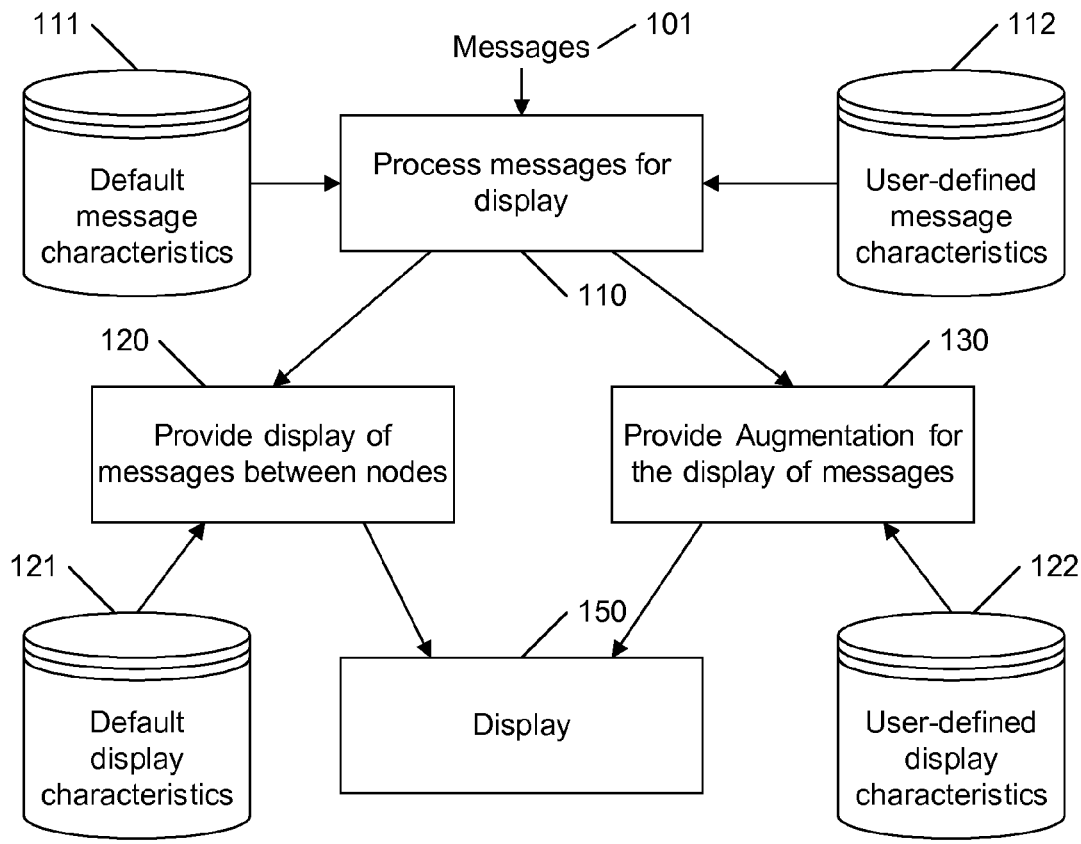
FIG. 1 illustrates an example flow diagram of an embodiment of a network analysis system in accordance with this invention.

FIG. 1 illustrates an example flow-diagram of an embodiment of a network analysis system in accordance with this invention. As in a conventional network analysis system, messages 101 are received and processed 110 for subsequent display based on default message characteristics 111. For example, as noted above, a primary function of a network analysis system is to provide a graphic display of the exchange of messages or packets between nodes of a network. Therefore, each message is processed to identify the source and destination of the message. This source and destination information serves to facilitate, for example, the drawing of a line or vector representation of the message between the representations of each of the source and destination nodes, the compilation of statistics relative to each node or each pair of nodes, the sorting or filtering of messages related to particular nodes, and so on. In like manner, a primary factor in the analysis of network performance is the effective throughput provided by each link of the network, and therefore the processing of messages in a conventional system includes the determination of the size of each message. Other message characteristics may also be identified during the default processing of the received messages to facilitate distinguishing or characterizing each message. As also noted above, generally each determined characteristic is generally available via a text-based output, while the characteristics that are determined to be most significant to the 'typical' user are selected for display in a graphic format.

The choice of message characteristics or combinations of message characteristics to use for distinguishing or characterizing messages is virtually limitless. Because most users may be interested in knowing the size of each packet, the graphic display is generally configured to display the size of each packet using different colors or thicknesses of the arrows between node time lines based on a range of sizes. In another use, some users may want to distinguish between original transmissions and re-transmissions. Similarly, some users may want to distinguish between "ftp" and "http" transfers; other users may want to distinguish messages addressed to a particular set of addresses; other users may want to distinguish among the different types of http messages; and so on. The development of a customized display for each potential user or class of users has been found to have a number of substantial limitations. It is difficult to anticipate demands, particularly as the user-base expands in scope beyond the original user-base of network administrators. It is costly to develop, document, and support the tool as the number of provided distinguishing message characteristics increases. And, the processing of each message for distinguishing or characterizing based on a large number of supported characteristics can adversely affect the performance of the system, by requiring the identification of each of the characteristics in each message and storing this identifying/distinguishing information.

Continuing the description of FIG. 1 with regard to correspondence with the conventional traffic analysis systems, the processed messages are displayed 120 on a display device 150, based on a set of default display characteristics 121. The display characteristics 121 are dependent upon the particular display format. The display characteristics for a graphic format may include, for example, a set of colors that represent particular ranges of sizes of the messages, the highlighting of messages from a particular source, destination, or source-destination pair, or other means of illustrating or highlighting the distinction among messages based on the default message characteristics 111 associated with the particular graphic display format. Other output formats, such as a text-based tabular format, may include all of the message characteristics.

Although many conventional systems allow a user to re-define, for example, the assignment of colors to each range of message size, such systems limit the user's abilities to a modification of an existing display format, rather than a replacement of the existing display format with additional information. That is, for example, if the conventional system provides color to distinguish a particular attribute, the user may be provided the option of changing the color scheme used; however, if the conventional system does not provide the use of color for another attribute, the user is not provided the option of using color for that attribute.

In accordance with an aspect of this invention, the user is provided the option of augmenting 130 the display of messages based on user-defined display characteristics 122. That is, in the absence of user intervention, the display 120 of the messages will be based on a set of default display characteristics 121. Alternatively stated, all users are automatically provided with the ability to display the messages based on the characteristics identified in the default display characteristics 121. The user-defined display characteristics 122 allow for augmenting the display that is based on the default display characteristics 121. For example, a user may wish to use color to identify the source and destination characteristics of the messages, even though the default display characteristics 121 do not provide for colorizing based on source and destination characteristics. Similarly, if the message characteristics include the protocol used within the message, the user-defined display characteristics 122 can include a scheme, such as colorization or other visual characteristic, to visually distinguish each protocol, regardless of the visualization provided by the default display characteristics 121 for the particular output format.

The augmentation of the default output can be applied to text-based output formats as well. In accordance with a further aspect of this invention, graphic symbols and visual effects, such as color, can be defined within the display characteristics 121, 122 for the tabular output format. For example, the color of each row of the table can be based on the type of message displayed in the row; in like manner, arrows or other symbols can be used to indicate the message direction or type; and so on.

A particularly useful user-defined display characteristic is the use of user-defined labels. In the aforementioned examples, the user can define labels that identify particular protocols, or labels that identify messages from a particular source to a particular destination, or labels that identify the source of particularly large messages, and so on.

In accordance with a further aspect of this invention, the user is also provided the option of defining characteristics 112 to distinguish among messages. For example, if the default message characteristics 111 do not include the message's protocol as a distinguishing characteristic, the user can define it as such in the user-defined message characteristics 112. When the user defines such a characteristic, the processing 110 of each message includes identifying that characteristic in the message. Thereafter, this identification of the user-defined characteristic 112 for each message can be used for displaying this characteristic, typically via the user-defined display characteristics 122. However, providing for user-defined message characteristics 112 and display characteristics 122 are preferably independent. For example, there may be default display characteristics 121 for displaying user-defined message characteristics 112, such as a default inclusion in the tabular format, just as there may be user-defined display characteristics 122 for default message characteristics 111.

As with the default display characteristics, for the purpose of this disclosure, the term "default message characteristics" is used to identify those characteristics that the network analysis system is configured to identify relative to each message. That is, in the absence of user intervention, the processing 110 of the messages 101 will be based on a set of default message characteristics 111. Alternatively stated, all users are automatically provided with the ability to distinguish among messages based on the characteristics identified in the default message characteristics 111. Correspondingly, the term "user-defined message characteristics" 112 are defined as those characteristics that are not included in the "default message characteristics" 111 and are used during the processing 110 of the messages 101.

Figure 2:
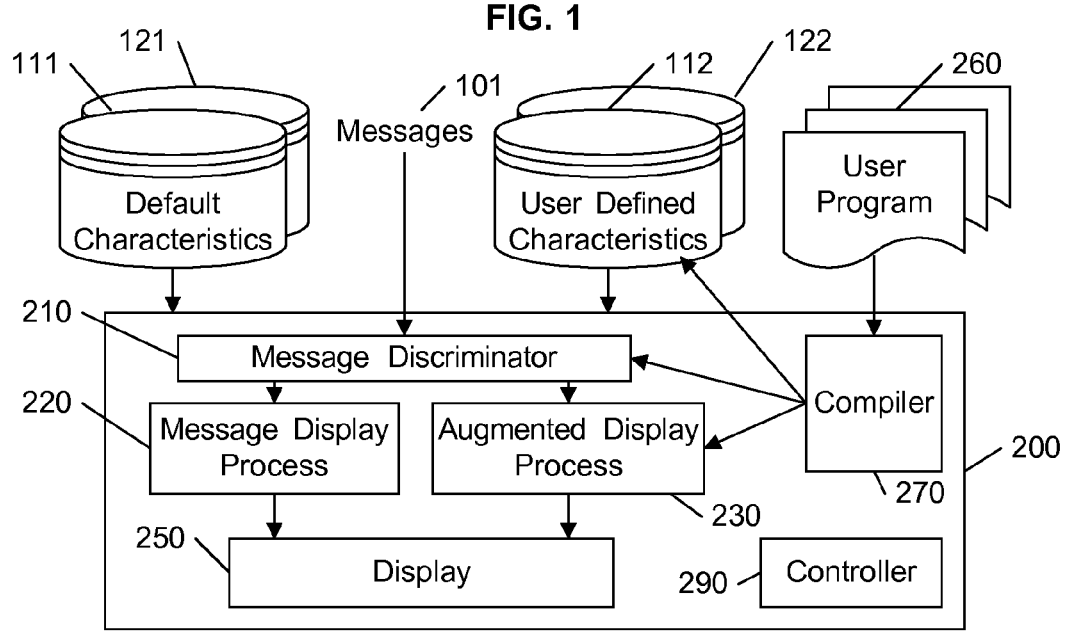
FIG. 2 illustrates an example block diagram of an embodiment of a network analysis system in accordance with this invention.

FIG. 2 illustrates an example system 200 for embodying some or all of the aspects of this invention. A message discriminator 210 discriminates messages 101 based on message characteristics 111, and optionally, 112. The discriminating information is provided to a message display processor 220 for display on a display device 250, based on display characteristics 121, and optionally, 122.

The message discriminator 210 receives the messages 101 and identifies characteristics associated with each message. These characteristics may be default characteristics 111, which are the characteristics that the developers of the system 200 have identified as being of interest to users of the system. That is, the identification of the default characteristics 111 in each message is available to any user of the system. As in conventional systems, a user may select from among the default characteristics 111, and limit the processing in the message discriminator 210 with respect to selected characteristics, to limit the processing to these selected characteristics, for efficiency. In addition to these available pre-defined message characteristics 111, the message discriminator 210 also discriminates messages based on user-defined message characteristics 112. That is, the user-defined characteristics 112 are not provided to each user of the system; they are defined by the particular user or group of users of the system 200.

As discussed further below, the term 'user-defined' is used for convenience, to distinguish the particular characteristics from the 'default' characteristics, and would include, for example, the definition of characteristics that are provided for a particular user, or particular application, and are separate and distinct from the default characteristics 111, or 121, regardless of who actually performs the task of adding such characteristics 112, or 122, to the user's version of the program. Alternatively stated, with regard to the user-defined message characteristics 112, the message discriminator 210 in accordance with one aspect of this invention is configured to process messages 101 based on a pre-defined set of message characteristics 111 that is provided by the provider of the system 200, and also based on message characteristics 112 that are subsequently added after the system 200 is provided to a user, herein termed user-defined characteristics 112.

For example, a user may wish to identify particular content information in messages to distinguish the messages, such as identifying all messages that include a particular person's name in the body of the message. If the default message characteristics 111 do not include 'content' as a distinguishing characteristic, the user-defined characteristics 112 would include a definition of content, such as "all text after the header", and also define a value of that characteristic as true/false depending upon whether the content included the particular name. The person providing these defined characteristics, however, need not be the user, per se, and could be a field-service engineer who provides service to the user. Thereafter, using the defined characteristics 112, the display of the messages would be able to visually distinguish messages that include the person's name in the body of the messages, even though the system 200 was not configured to distinguish by content in its original configuration. This allows for a system that satisfies user requirements for content-based distinction, without having had to pre-determine that "the market" desires the ability to distinguish messages based on content. In a preferred embodiment, the user is able to link user-defined programs to the system, thereby facilitating a wide range of customization by each user. In like manner, by allowing for customization after the system 200 is deployed, a third-party provider may define particular characteristics for a target set of potential customers.

In a typical embodiment, the developer of the system 200 defines a collection of functions that provide controlled access to internal parameters of the system, but is freed of the task of developing customized visualizations based on anticipated possible uses of these parameters.

The message display processor 220 is configured to receive the discriminating information from the message discriminator 210, and to provide a display of the messages based on this discriminating information. As noted above, the discriminating information is based on the defined characteristics 111, 112 of each message. For example, if the size of the message is defined as a discriminating message characteristic in either 111 or 112, the message discriminator 210 determines or extracts the size of each message 101 and provides this determined size to the message display processor 220. In like manner, other defined characteristics 111, 112, such as the source, destination, protocol, and so on, are identified for each message 101 by the message discriminator 210 and provided to the message display processor 220.

The message display processor 220 provides a display of the messages based on the identified message characteristics 111, 112, and based on pre-defined display characteristics 121. The display characteristics 121 define how the message characteristics 111, 112 are visually presented to the user in each output format, and the message display processor 220 effects this visualization on the display 250. The display characteristics 121 may include, for example, a colorization based on message size in one or more output formats, and the message display processor 220 is configured to apply this colorization to the display of the messages in each of these formats based on the size of each message. Of particular note, the display processor 220 and the default display characteristics 121 place a limit on what information may be displayed, in that only the display characteristics 121 that the display processor 220 is configured to provide will be included in the display of the messages. If the display characteristics 121 do not include, for example, a colorization based on source and destination nodes, the display processor 220 cannot effect a visualization that distinguishes source and destination nodes by color, even though the message characteristics 111 may allow for distinguishing by source and destination nodes.

The augmented display processor 230 allows for augmentation of the display of the messages provided by the message display processor 220, based on user-defined display characteristics 122. In the above example, the user-defined display characteristics 122 may define colorization based on source and destination nodes that are not included in the default display characteristics 121, and the augmented display processor 230 is configured to augment the display to include this colorization. Such colorization may be based on message characteristics defined in either the default message characteristics 111 or the user-defined message characteristics 112. In this manner, the user can define both the message characteristics of interest and define how these message characteristics are displayed. For example, the user-defined message characteristics may include the type of message, for example, whether the message is an original message or a re-transmission. The type of message may also be based on official or unofficial network port assignments. For example, messages sent to port 80 (HTTP messages) may be distinguished from messages sent to port 20 (FTP messages). In like manner, the user-defined message characteristics 112 could include distinguishing types of messages within a given protocol, such as distinguishing SYN, FIN, and ACK messages from data-filled messages in TCP; distinguishing HTTP messages by response-code type, Get/Put messages, and transmitted data; and so on. Correspondingly, the user-defined display characteristics could identify a color scheme for each of these types, or each grouping of types, and the displayed messages would be displayed using these colors.

Of particular note, in addition to colorization, the labeling of messages has been found to be particularly effective for facilitating user-defined display characteristics. The augmented display processor 230 is configured to provide labels for the messages that are displayed by the message display processor 220, and the user-defined display characteristics 122 define the form and/or content of such labels. For example, the user-defined display characteristics 122 can define a label that is applied to each message above a given size, wherein the content of the label identifies the source of the message. In another example, the user-defined display characteristics 122 can define a label that is applied to all displayed messages, wherein the content of the label identifies the protocol of each label, or specifies that the label is only applied to messages of a given protocol.

Figure 3:
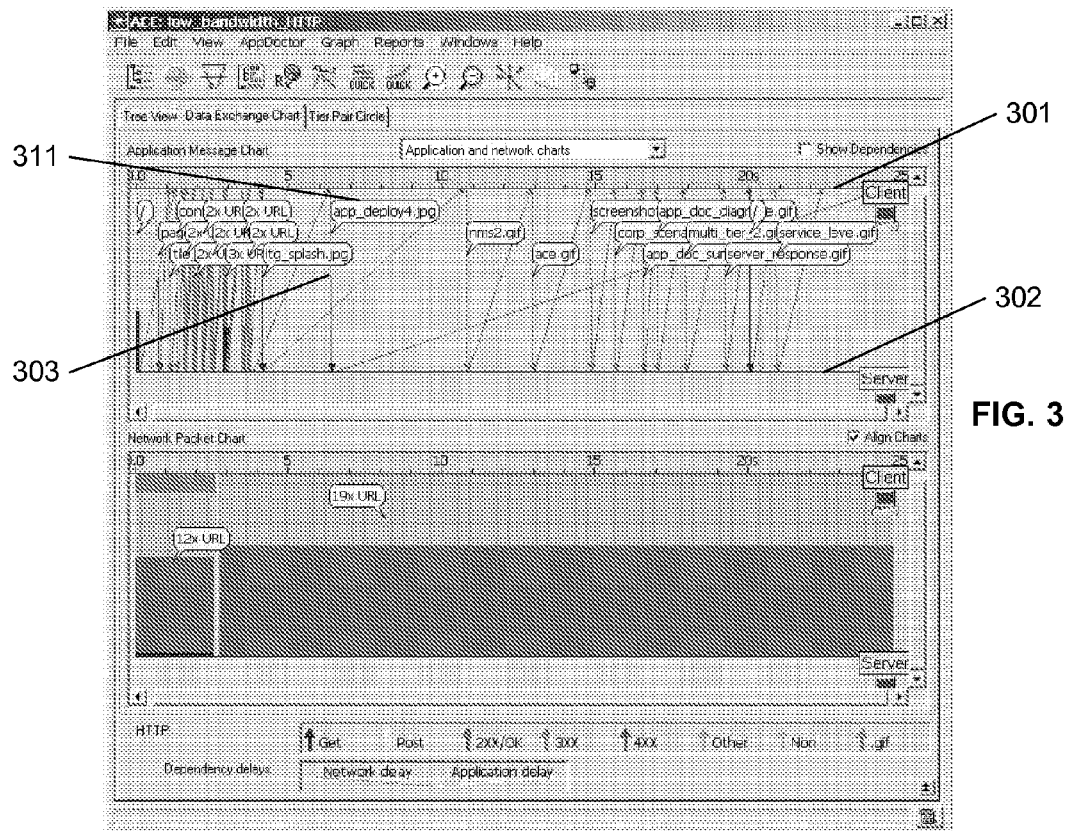
FIG. 3 illustrates an example graphic display of an embodiment of a network analysis system in accordance with this invention.
Figure 4:
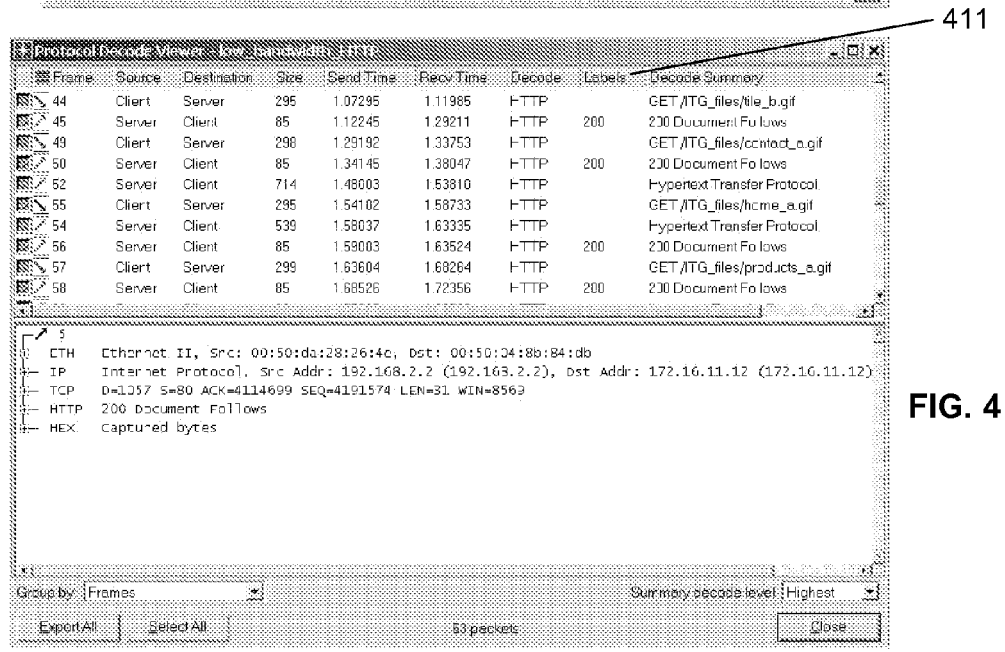
FIG. 4 illustrates an example tabular display of an embodiment of a network analysis system in accordance with this invention.

FIG. 3 illustrates an example display of messages with augmented labels. In this example, the labels are user-defined to identify URLs associated with messages. The display of the messages is presented in a Data Exchange Chart format, described above. Two nodes, "Client" and "Server" are illustrated by horizontal time lines 301, 302, and messages between these nodes are identified by arrows 303. The augmented display processor 230 of FIG. 2 in this example is configured to augment this display with labels that are displayed as text "bubbles" 311 with pointers to the corresponding message arrow 303. In a preferred embodiment, the user-defined display characteristics 122 may direct the shape, color, or other visual characteristics of the label, as well. These visual characteristics may be defined to be dynamic, in that, for example, the color of each label may be based on a statistic, such as an estimated propagation delay of the corresponding message. FIG. 4 illustrates an example display of messages in tabular form, augmented to include a column of labels 411. As noted above, the visual appearance of these labels, or each row of the table, may be based on characteristics of the corresponding message, or characteristics associated with each label.

The user-defined display characteristics 122 instruct the augmented display processor 230 to provide the labels, and specify that the text that appears in the label should be the URL associated with each message. As noted above, the default or user-defined message characteristics 111, 112 would need to identify the URL associated with each message as a message characteristic, and the processing of the messages would thereby identify these URLs for each message, so that the augmented display processor 230 could effect this URL-labeling.

As illustrated on the left side of the example display of FIG. 3, the augmentation of each label with user specified information may not be practical. Therefore, in a preferred embodiment of this invention, the augmented display processor 230 is configured to merge multiple labels into a composite label, such as "2× URL" or "19× URL", that points to a group of messages, to improve visibility. When the user 'zooms in' to be able to view discrete messages, the augmented display processor 230 displays the individual labels; also, if the user 'clicks on' a composite label, the individual labels are displayed, regardless of the zoom level.

When a user 'clicks on' an individual label, the processor 230 is also preferably configured to display additional information, related to either the particular message or the particular label. For example, if the label identifies a source of a very large message, clicking on or hovering over the label may provide a "tooltip" that identifies the destination, the actual size, and other characteristics of the message. In like manner, to conserve display space, the text in the label may be an abbreviation of the information intended to be displayed in the label, and clicking on the label effects a display of the unabbreviated text. In a preferred embodiment, clicking on a label also allows a user to relocate the label, using, for example, conventional drag and drop techniques, usually to improve visibility.

As in conventional systems, messages can be selected for additional processing by the network analysis tool. For example, if the message includes multiple packets, selection of the message may provide detailed information regarding each packet. In a preferred embodiment of this invention, selection of a label, or a set of labels, is interpreted to correspond to selection of the message(s) associated with the selected label(s).

Also in a preferred embodiment, the user is provided the opportunity to add additional information, such as a comment, to each label, and to configure the augmented display processor to display or otherwise process this additional information. For example, the user may add comments to the labels, and then filter or sort the display of the messages based on these comments. In like manner, the user may filter or sort the display of the messages based on the content of the labels, as well. For example, in the example of FIG. 3, the user is preferably provided the option of displaying only the messages associated with a particular URL, or only the messages associated with a subset of the URLs, such as only those with a "jpeg" suffix, or all those that do not have a "jpeg" suffix, and so on. Similarly, the preferred system is configured to allow a user to search for particular labels, or particular comments.

The augmented display processor 230 of FIG. 2 is also preferably able to augment the display of messages based on determined dependencies among messages. For example, copending U.S. patent applications Ser. No. 11/180,878, "PACKET TRACING", and Ser. No. 11/180,879, "CORRELATING PACKETS", each filed 13 Jul. 2005 for Patrick J. Malloy, Michael Cohen, and Alain J. Cohen, respectively, and each incorporated by reference herein, teach techniques for identifying transactions corresponding to a particular application, identifying multiple packets that are part of the same transaction, and identifying query-response interactions, and other relationships among communication packets. In an example embodiment, the user-defined message characteristics could include these determined relationships, and the user-defined display characteristics could include labeling or coloring the messages based on their relationships and/or dependencies. Similarly, copending U.S. patent applications Ser. No. 11/358,538, "TRACKING, ANALYZING, AND VISUALIZING APPLICATION DELAY", filed 21 Feb. 2006 for Malloy et al., and Ser. No. 11/506,649, "IDENTIFYING A TRANSACTION OF INTEREST WITHIN A NETWORK", filed 18 Aug. 2006 for Malloy et al., teach techniques for defining and displaying relationships and dependencies among messages, and are each incorporated by reference herein.

In a preferred embodiment, the system 200 allows for dynamic updating of the user-defined display characteristics 122, so that the user can interact with the system to develop a display of the messages that is customized for a particular task. That is, for example, a user may choose to initially display the messages using the default display characteristics, then progressively define and refine the display to identify messages that serve to facilitate the user's task, such as diagnosing a particular problem. In like manner, the user may progressively define and redefine the user-defined message characteristics 112, although this interaction will generally require that the messages 101 be reprocessed by the message discriminator 210.

The form and format of the user-defined characteristics 112, 122 is dependent upon the requirements of the particular message discriminator 210 and display processor 230, and may take the form of a structured list, or other substantially machine-readable form. Typically, the developer of the system 200 includes the appropriate interface and capabilities that allow the user to add user-defined message or display characteristics 112, 122, and provides for the communication of these characteristics to the message discriminator 210, and display processor 230, and perhaps other modules within the system 200. The user interface for adding display characteristics, for example, could be configured to display all of the currently available message characteristics 111, 112. The user is given the option of selecting any of the available characteristics, then provided a menu of available visualization elements, such as color and labels, then sub-menus for defining the correspondence between values of the selected characteristic and values associated with the visualization element. For example, if the selected characteristic is message protocol type, and the visualization element is color, the user may associate the color blue with HTTP, and red with FTP. Combinations of message characteristics may also be defined, such as coloring retransmitted HTTP packets green and original HTTP packets blue, or using different shades of blue to indicate the size of the HTTP packets, and so on. Optionally, a set of default parameters may be associated with visualization elements and/or message characteristics, so that a user is not required to navigate through the variety of available menus and sub-menus. For example, if the user selects protocol message type as a characteristic to be displayed, and nothing else, the remaining display characteristics assume the default parameters, such as "visualization=label", "value=value_of(message_protocol_type)", and so on. To further simplify the user's task, the system can be configured to provide a simplified menu for characteristics that are considered more likely to be selected, and provide a more comprehensive capability for 'advanced' users, such as discussed further below.

To facilitate flexible creation and modification of user-defined characteristics 112, 122, and to facilitate the programming of the message discriminator 210 or processor 230 to implement the desired message discrimination and display visualization, the system 200 preferably includes a compiler 270 that is configured to accept user definitions and directives in the form of user programs 260. The term compiler is used herein in the general sense, to identify a process of allowing instructions provided by a user to be executed by a processor, and may include, for example, an interpreter, an assembler, an object instantiator, and so on. In like manner, the term program is used herein in the general sense to identify a set of definitions and/or directives that are expected to cause a processor to operate in a particular manner.

Figure 5:
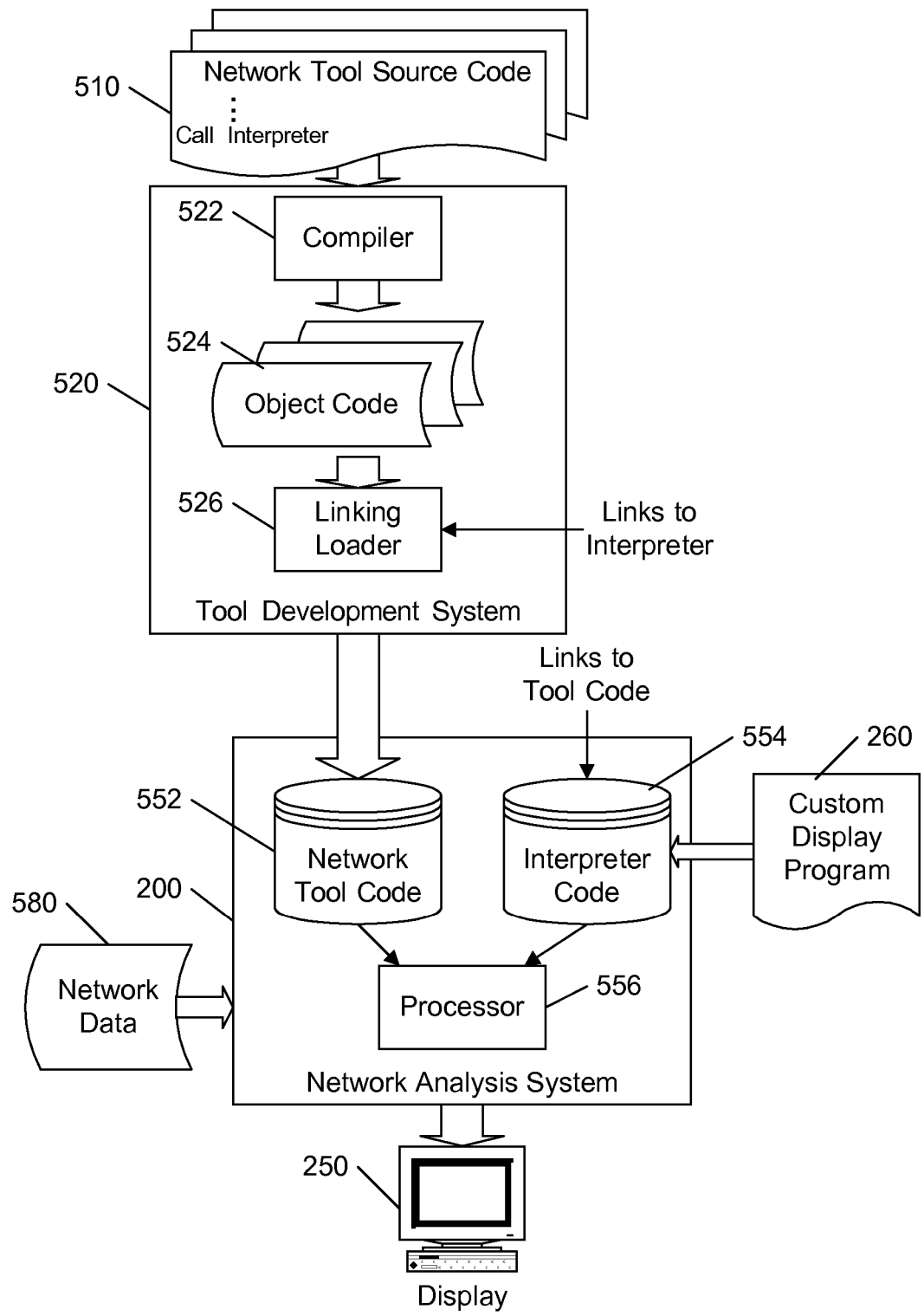
FIG. 5 illustrates an example block diagram of a system that supports user-definable programs in a network analysis system in accordance with this invention.

FIG. 5 illustrates an example embodiment that for enabling the use of user programs in a network analysis tool.

A tool developer prepares source code 510 that defines the sequence of tasks that are to be performed when the tool is used. The tool may include, for example, an analysis system that receives reports of messages transferred through a network and produces a display that facilitates the identification of bottle-necks or other situations that affect network performance. In like manner, the tool may be a simulation system that models the propagation of messages through a model of a proposed network, to predict such bottle-necks or other situations that may affect network performance. Other network analysis, simulation, and diagnostic tools are common in the art.

A tool development system 520 processes this source code to produce tool code 552 that is executable by a processor 556 in a network analysis system 200. The tool code 552 is configured to process data 580 that defines or models an actual or proposed network, to display 590 results corresponding to the processing of this network data 580.

Conventional network tools are self-contained 'closed' systems, in that only the tasks that are defined in the network tool source code 510 by the tool developer can be performed by the network tool. If additional and/or customized features are desired, the tool developer modifies the network tool source code 510 and uses the tool development system 520 to create a new version of the network tool code 552 that is able to provide these new features.

In accordance with an aspect of this invention, the network tool source code 510 includes one or more calls 515 to an auxiliary program, such as the compiler 270 of FIG. 2, that is configured to execute as-yet-undefined programs 260. In the example of FIG. 5, the compiler 270 of FIG. 2 is embodied as an interpreter 554, wherein executable code is produced as the program is being executed. One of skill in the art will recognize that a true compiler could be used as well, wherein the executable code is produced by pre-processing the program 260 before the tool code 552 is executed. If the executable code is produced by pre-processing the program 260, the references herein to calls to the interpreter program 554 will be replaced by calls to the executable code produced by the compiler.

In the network analysis system 200 of FIG. 5, as the network tool code 552 is being executed, the processor 556 is directed by the network tool code 552 to execute a program 554 that is configured to execute one or more programs 260 that are not included in the original network tool code 552, such as a custom designed display program.

To facilitate enabling the custom designed program 260 to affect and/or augment the tasks performed by the network tool code 552, links to particular functions within the network tool code are made available to the program 554, thereby enabling the custom designed program 260 to invoke these functions. For example, the links to the network tool code 552 may include functions for determining characteristics of a message, such as a function within the tool code 552 that provides the size of a referenced message, or a function that provides the header information of a referenced message, and so on. In like manner, the links to the network tool code 552 may include functions for affecting the output from the tool, such as a function that draws a representation of the message with particular style or color attributes, or a function that produces a 'bubble label' containing specified text attached to the message, as illustrated at 311 of FIG. 3, or a function that defines the format of an output table, such as the table at the upper region of FIG. 4, and so on.

In a preferred embodiment, the calls 515 to the auxiliary program 554 are structured to occur as each message is processed by the tool code 552, within, for example, the message discriminator 210 and/or augmented display process 230 of FIG. 2. These calls 515 are configured to pass appropriate parameters, such as a reference to the current message and the defined characteristics of the message, to facilitate interaction by the custom program 260 with the tool code 552. In the general case, each call 515 to the auxiliary program 554 communicates the current state of the tool code 552 so that the custom program can perform tasks based on the current state. Preferably, the custom program 260 cannot modify the state of the tool code 552, thereby assuring that the custom program 260 cannot adversely affect the proper operation of the tool code 552.

FIGS. 6A and 6B illustrate an example custom program to illustrate a set of interactions between the tool code 552 and the interpreter code 554 of FIG. 5 to effect the execution of this custom program. In this example, the custom program facilitates the creation of user defined display characteristics using an object-based programming language, such as PYTHONTM, which is an open source program available from the Python Software Foundation. In this example, a set of predefined object constructs are defined to facilitate interaction with tool code 552, and particularly to the augmented display process 230 of FIG. 2, which is purposely configured to display messages with user-defined augmentation, such as coloring and labeling.

In FIG. 6A, a visualization entitled "Packet Count" 601 is defined. This defining routine will be invoked by an "initialize" call from the tool code 552 to the interpreter code 554. The defined name is passed back to the tool code 554, and will preferably appear in a 'visualization menu' provided by the tool code 552, from which the user selects the visualization(s) to be applied to the current display of messages. In this example, when the user selects the use of this visualization, a coloring scheme entitled "Packet Count Color" 602 will be invoked by a call to the interpreter code 554 each time a message is to be assigned a color for display by the tool code 552. This visualization could also, or alternatively, direct the use of a labeling scheme, or other schemes supported by the tool code 552.

The "Packet Count Color" coloring procedure is defined at 610. The title "Packet Count Color" 611 establishes the correspondence between this procedure and its reference 602 in the "Packet Count" 601 visualization. The library field provides the name "count" 612 of a library where subsequently referenced functions are located; generally, this library is provided by the tool code 552, and provides the links to the interpreter code 554 for the referenced functions.

The init_function field provides the name "count_color_init" 613 of the function that is invoked when the process is initially invoked, and typically serves to define the colors that will be used for the color scheme. The appl_msg_function provides the name "count_message_color" 614 of the function that is invoked each time the call to the interpreter 554 indicates that an application message is being processed by the tool code, and, in this example, serves to define the color that should be applied to the particular application message. The netpk_function field provides the name "count_packet_color" 615 of the function that is invoked each time the call to the interpreter code 554 indicates that a network packet is being processed by the tool code 552, and, in this example, serves to define the color that should be applied to the particular packet.

It should be noted that this example presupposes that the messages that are being displayed include a message characterization that identifies the message as an application message ("appl_msg") or a network packet ("netpk"), in order to pass this characterization with the call to the interpreter code 554 to determine which function to invoke. This message characterization may be a default characterization or a user-defined characterization, as discussed above. In a preferred embodiment, another custom program 260 can be used to define the message characterization, and to establish a correspondence to the function fields 614, 615 that are used to invoke function calls based on the determined characterization, just as the definition of the visualization defines which functions 602 are invoked for coloring, labeling, and so on.

FIG. 6B illustrates the example functions 613', 614', and 615' that are referenced as 613, 614, and 615 in the "Packet Count Color" procedure 610 of FIG. 6A.

The "count$_{13}$ color$_{13}$ init" function 613' is called 613 when the coloring procedure 610 is initialized, and defines four colors 651 that are to be subsequently used within the "Packet Count Color" procedure 610. In this example, hexadecimal numbers are used to define each color, corresponding to Red-Green-Blue (RGB) combinations; one of skill in the art will recognize that symbolic names may also be used, where each symbolic name is globally defined to correspond to the appropriate RGB value. These colors are stored in an array "colors[ ]", indexed as color[0], color[1], color[2], and color[3] associated with this procedure 610, and used by the tool code 552 to apply a color to the display of the message based on an index to the array that is subsequently provided by the coloring function 610 as each message is processed. This initialization function also defines the descriptive legends 652 for the corresponding colors 651. In this example, if one packet is counted, it will be displayed in red ("#ff0000"), and a legend will be provided to indicate that a red message corresponds to "1 Packet". In like manner, if four or more packets are counted, the message will be displayed in blue ("#0000ff"), and the legend will indicate that a blue message corresponds to "4+ Packets".

The "count_packet_color" 615' and "count_message_color" 614' functions each determine the number of packets in a network packet message or an application message, respectively, depending upon whether the "ntpk_function" or "appl_msg_function" field 615, 614 of FIG. 6A is invoked based on the message characteristics. These functions are structured to return the index (0, 1, 2, or 3) to the color array for displaying the color of the particular message.

The "count_packet_color" 615' function merely returns a value of zero, at 661, indicating that an index of 0 should be used for identifying the color for all network packets, because a network packet, by definition is a single packet.

The "count_message_color" 614' function calls another function, at 671, "msg.get_num_network_packets ( )", which, in this example, is configured to determine how many packets are contained in the message currently being processed. The variable "count" receives the number of packets in the current message. The index to the color array is one less than this count, with a maximum value of three. Therefore the "count_message color" function 614' returns the value of count less one, or three, whichever is less, at 672.

Although the example of FIGS. 6A and 6B specifically address user-definable colorization, one of ordinary skill in the art will recognize that the system can be similarly configured to offer the above programming capabilities for user-definable labeling and other user-defined display techniques. One of ordinary skill in the art will also recognize that the custom programs 260 need not be limited to the object constructs that are predefined for interacting with the message discriminator 210 or display processor 260 of FIG. 2.

By allowing a user to provide programs 260 to self-program the network analysis system 200, the user is able to customize the system 200 for the user's specific needs, thereby substantially reducing the need for the developers of the system 200 to anticipate each need and provide custom-designed discriminators or display processors that fulfill all of these anticipated needs.

One of skill in the art will recognize that although the system of FIG. 5 is particularly well suited for allowing end-users to customize the input processing and/or output display in a network analysis tool, the system of FIG. 5 can be used by a variety of users, or classes of users of the system 200. As used herein, the term "user" is intended to distinguish between the developers of the network tool source code 510, and the person who augments the features provided by the developers of the tool code 510 to customize the system for a particular use. As noted above, for example, the user could be a field support engineer who customizes the system 200 for a particular customer, or a marketing person who customizes the system for presentation to a particular audience of potential customers. The user could also be a development engineer operating in a research mode to experiment with different options before developing the "production" tool source code 510.

One of skill in the art will also recognize that a market may exist for custom designed programs 260, particularly for programs 260 that are customized for a particular class of users of the analysis system 200. For example, the requirements for particular display options may be specific to particular fields of use. Network administrators may have requirements and desires for displaying messages that are generally different from the requirements and desires of network designers, and application developers may have different requirements and desires than either the administrators or the designers. A user of the system 200 could provide such custom programs 260 for sale and/or distribution among other users.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the message discriminator 210, message processor 220, and display augmenter 230 are presented above as separate entities, for ease of understanding, whereas one of ordinary skill in the art will recognize that these functions may be embodied using a different structure, including an embodiment wherein some or all of these functions are integrated in a common functional unit. Similarly, although the user-defined message characteristics 112 and display characteristics 122 are discussed above as separate sets of characteristics, a single set of characteristics may be used to define both sets. Further, in a system that uses a compiler to receive user programs that provide the user-defined characteristics, the compiled modules may form the characteristics 112, 122, and may be stored in non-permanent memory for use during the particular message processing session. In like manner, any or all of the characteristics 111, 112, 121, 122 may be distributed among a variety of modules in the system, and need not be located in a 'database' or 'data structure', per se. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements, and can include an immeasurable number of elements;
j) the terms "between" and "among" are used substantially synonymously, and do not imply a particular number of items.

We claim:
1. A network analysis system comprising:
a network tool program that processes messages and provides a display that illustrates values of attributes of the messages exchanged between nodes of a network, wherein the display is based on one or more of a plurality of pre-defined displayable attributes contained within the network tool program;
an auxiliary program that processes one or more external programs that are not included in the network tool program, wherein the one or more external programs selectively augment the display by providing additional dis- playable attributes that are different from the pre-defined displayable attributes in the network tool program, and a processor that:
  executes the auxiliary program to process the one or more external programs, and
  executes the network tool program to provide a display that illustrates values of one or more of the additional displayable attributes.

2. The system of claim 1, wherein: the external program is configured to augment the display by providing data to the network tool program, and the network tool program is configured to selectively modify the display of the messages based on the data from the external program.

3. The system of claim 2, wherein the network tool program is configured to facilitate user-interaction to modify the display, including modifications based on the data from the external program.

4. The system of claim 1, wherein the network tool program is configured to provide at least one call to the external program for each message that is being displayed.

5. The system of claim 1, wherein the network tool program is configured to characterize each message, and to provide at least one call to the external program for each message that is being characterized, and the external program is structured to augment the characterization of the message that is provided by the network tool program.

6. The system of claim 1, wherein the auxiliary program includes a compiler that is configured to process the external program to enable execution of the external program by the processor.

7. The system of claim 6, wherein the compiler is configured to interpret contents of the external program to provide instructions that are executable by the processor during each call from the network tool program.

8. The system of claim 7, wherein the compiler includes a PYTHON interpreter.

9. The system of claim 6, wherein the compiler is configured to pre-process contents of the external program to provide stored sets of instructions that are executable by the processor during each call from the network tool program.

10. The system of claim 6, wherein
  the network tool program is configured to receive data from the external program corresponding to one or more pre-defined structures, and
  the compiler is configured to process contents of the external program based on the one or more predefined structures.

11. The system of claim 10, wherein the one or more predefined structures includes a structure for identifying a color to be applied to the display of select messages.

12. The system of claim 10, wherein the one or more predefined structures includes a structure for identifying a label to be applied to the display of select messages.

13. The system of claim 12, wherein the label is configured to display an attribute of the select messages.

14. The system of claim 13, wherein the attribute includes a URL contained in the message.

15. The system of claim 13, wherein the attribute includes an identification of whether a given content item is included in the message.

16. The system of claim 12, wherein the processor is configured to: consolidate multiple labels based on a spatial proximity of the display of the multiple labels, and provide a consolidated label corresponding to the multiple labels.

17. The system of claim 6, wherein the network tool program is configured to provide one or more initialization calls that are configured to initialize components of the external program, and the compiler is configured to facilitate identification of initialization segments of the components of the external program that are to be executed upon receipt of the one or more initialization calls.

18. The system of claim 6, wherein the network tool program is configured to communicate one or more characteristics of each message to the external program, and the external program is configured to selectively perform one or more tasks based on the one or more characteristics.

19. The system of claim 18, wherein the external program is configured to invoke a procedure in the network tool program to obtain the one or more characteristics.

20. The system of claim 18, wherein the one or more characteristics include a message type.

21. The system of claim 18, wherein the one or more characteristics distinguish between application messages and network packets.

22. The system of claim 18, wherein the one or more characteristics include an identification of whether a given content item is included in each message.

23. The system of claim 18, wherein the display is configured to represent the messages as lines between the nodes, and the external program is configured to selectively control an attribute of the lines based on the one or more characteristics.

24. The system of claim 18, wherein the display is configured to represent the messages in a table, and the external program is configured to control an attribute of entries in the table based on the one or more characteristics.

25. The system of claim 24, wherein a column of the table is configured to include a label associated with each message, and the external program is configured to selectively create the label based on the one or more characteristics.

26. The system of claim 18, wherein the external program is configured to apply a common color to the display of messages having a common characteristic.

27. The system of claim 18, wherein the one or more characteristics include identifying whether the message is a retransmission of a prior message.

28. The system of claim 18, wherein the one or more characteristics of the message include a relationship to one or more other messages.

29. The system of claim 28, wherein the relationship includes dependency.

30. The system of claim 1, wherein the display of the messages corresponds to a data exchange chart.

31. A non-transitory computer readable medium that includes a network analysis program that includes a network tool program and an auxiliary program, wherein:
  the network tool program causes a processor to process messages and provides a display that illustrates values of attributes of the messages exchanged between nodes of a network based on one or more of a plurality of pre-defined displayable attributes contained within the network tool program,
  the auxiliary program causes the processor to process one or more external programs that are not included in the network tool program, wherein the one or more external programs selectively augment the display by providing additional displayable attributes that are different from the pre-defined displayable attributes in the network tool program, and
  the network analysis program causes the processor to:
    execute the auxiliary program to process the one or more external programs, and execute the network tool program to provide a display that illustrates values of one or more of the additional displayable attributes.

32. The medium of claim 31, wherein: the external program is configured to cause the processor to augment the display by providing data to the network tool program, and the network tool program is configured to cause the processor to selectively modify the display of the messages based on the data from the external program.

33. The medium of claim 32, wherein the network tool program is configured to provide at least one call to the external program for each message that is being displayed, and the external program is structured to cause the processor to selectively augment the display of the message that is provided by the network tool program.

34. A network analysis system comprising:
a network tool program that is configured to process a plurality of messages and provide a display that illustrates values of attributes of the plurality of messages exchanged between nodes of a network based on default characteristics and a set of pre-defined displayable attributes,
a processor that executes the network tool program and applies a custom visualization based on a visualization program that is external to the network tool program, and
a compiler that is configured to process the visualization program to enable execution of the visualization program based on calls from the network tool program, wherein
the custom visualization is configured to augment the display according to one or more custom characteristics and custom attributes that are not included in the set of pre-defined displayable attributes.

35. The system of claim 34, wherein the visualization program is created by a user after installation of the network tool program on the network analysis system.

36. The system of claim 34, wherein the one or more custom characteristics and attributes include at least one pair of a message attribute and a corresponding display characteristic.

37. The system of claim 34, wherein: the custom attributes include a message type, and the visualization is configured to augment the display of messages corresponding to the message type.

38. The system of claim 34, wherein: the custom attributes include a content item, and the visualization is configured to augment the display of messages that include the content item.

39. The system of claim 34, wherein the plurality of message are illustrated as lines between the nodes, and the visualization is configured to augment the display of the lines based on the custom characteristics.

40. The system of claim 34, including an input processor that is configured to allow a user to select one of a plurality of visualizations based on at least one of the custom attributes, wherein the processor is configured to augment the display with the user-selected visualization.

41. The system of claim 34, wherein the visualization is configured to apply a common color to the display of messages associated with a common custom attribute.

42. The system of claim 34, wherein: the processor is configured to identify relationships among the messages based on the custom attributes, and the visualization is configured to augment the display with visual indications of the relationships.

43. The system of claim 34, wherein the visualization is configured to augment the display with one or more labels based on the custom characteristics.

44. The system of claim 43, wherein each of the one or more labels corresponds to one or more messages and displays a value of at least one attribute of the corresponding one or more messages.

45. The system of claim 44, including an input processor that is configured to receive a user input corresponding to a selection of a label.

46. The system of claim 45, wherein the input processor is configured to allow a user to augment a location and content of the selected label.

47. The system of claim 45, wherein the selection of a label effects a selection of the corresponding one or more messages for further processing by the processor.

48. The system of claim 44, wherein the input processor is configured to enable a user to search the display of the messages based on content of the labels.

49. The system of claim 44, wherein the labels are displayed as a box with a pointer to the one or more corresponding messages.

50. The system of claim 43, wherein the processor is configured to: consolidate multiple labels based on a spatial proximity of the display of the multiple labels, and provide a consolidated label corresponding to the multiple labels.

51. The system of claim 34, wherein the display is configured to represent the plurality of messages as entries in a table, and the visualization is configured to provide entries in the table based on the custom attributes.

52. The system of claim 51, wherein the table includes a graphic indicator of a direction of each of the plurality of messages.

* * * * *